United States Patent [19]

Miyazawa et al.

[11] Patent Number: 5,776,411
[45] Date of Patent: Jul. 7, 1998

[54] SIMULTANEOUS INJECTION MOLDING AND PATTERNING METHOD USING HEATING BODY WITH NON-PARALLEL HEATING AND NON-HEATING POSITIONS

[75] Inventors: Kazushi Miyazawa; Keiji Hanamoto; Hiroyuki Atake, all of Tokyo-To, Japan

[73] Assignee: Dai Nippon Printing Co., Ltd., Japan

[21] Appl. No.: 850,754

[22] Filed: May 2, 1997

Related U.S. Application Data

[62] Division of Ser. No. 492,143, Jun. 19, 1995, Pat. No. 5,676,981.

[30] Foreign Application Priority Data

Jun. 21, 1994 [JP] Japan ................... 6-160775

[51] Int. Cl.$^6$ .............. B29C 45/15; B29C 51/10
[52] U.S. Cl. .............. 264/511; 264/513; 264/266; 264/269; 425/388
[58] Field of Search ................... 264/511, 513, 264/266, 269, 265, 544, 553, 554, 454, 457, 458, 522; 475/112, 122, 127, 129.1, 388

[56] References Cited

U.S. PATENT DOCUMENTS

| | | | |
|---|---|---|---|
| 3,801,244 | 4/1974 | Eisenberg | 425/112 |
| 4,545,752 | 10/1985 | Hanamoto et al. | 425/126.1 |
| 4,639,341 | 1/1987 | Hanamoto et al. | 264/511 |
| 4,676,938 | 6/1987 | Karklin et al. | 425/112 |
| 4,994,224 | 2/1991 | Itoh et al. | 264/247 |
| 5,415,536 | 5/1995 | Ohno | 425/127 |
| 5,707,581 | 1/1998 | Yamazaki | 264/511 |

FOREIGN PATENT DOCUMENTS

43 13 951 A1  11/1993  Germany.
63-6339       2/1988   Japan.

*Primary Examiner*—Jan H. Silbaugh
*Assistant Examiner*—Edmund H. Lee
*Attorney, Agent, or Firm*—Parkhurst & Wendel

[57] ABSTRACT

A simultaneous injection molding and patterning method, including the steps of providing a first mold and a mutually opposed second mold; interposing a decorative pattern sheet between the molds; moving a heating body from a non-heating position to a heating position so as to heat and soften a portion of the decorative pattern sheet positioned between the opposing molds. The heating position is arranged such that a heating surface of the heating body confronts the decorative pattern sheet while the sheet is positioned between the opposed molds, and the non-heating position is arranged such that the heating surface of the heating body is not parallel to the heating surface of the heating body when in the heating position. The first mold is then evacuated to bring the heated and softened decorative pattern sheet into contact with a cavity of the first mold, the molds are closed, and then molten resin is injected into the mold to form a patterned product including the decorative pattern sheet.

12 Claims, 13 Drawing Sheets

5,776,411

SIMULTANEOUS INJECTION MOLDING AND PATTERNING METHOD USING HEATING BODY WITH NON-PARALLEL HEATING AND NON-HEATING POSITIONS

This is a Division of application Ser. No 08/492,143 filed Jun. 19,1995, U.S. Pat. No. 5,67,981.

BACKGROUND OF THE INVENTION

1. Field of the Invention

The present invention relates to a simultaneous injection molding and patterning apparatus and method, and more specifically to a heating device for heating a decorative pattern sheet used to form a pattern onto the outer surface of a molded product simultaneously when a product is molded. In particular, the heating position of a heating surface of the heating device for heating the decorative pattern sheet is not parallel to the non-heating position of the heating surface of the heating device, to reduce an installation space of the apparatus.

2. Description of the Prior Art

Various simultaneous injection molding and patterning methods have been so far known such that a pattern can be formed on the outer surface of a product simultaneously when the product is being injection molded.

In a first example as disclosed in Japanese Published Examined Patent Application No. 50-19132, a decorative pattern sheet formed of a thermoplastic resin is first molded under a vacuum by use of a female mold formed with a vent for vacuum molding; the two mated molds are clamped; a molten resin is injected into the mold; and the decorative pattern sheet is attached to the outer surface of the molded product. In the above-mentioned simultaneous injection molding and patterning method, the vacuum molding and the injection molding are both combined with each other, so that it is possible to form a pattern on a relatively complicated curved surface of the molded product.

Further, in a second example as disclosed in Japanese Published Examined Patent Application No. 63-6339, a wound up continuous sheet roll having locating sensor marks is used as the decorative pattern sheet, and the decorative pattern sheet is supplied in such a way as to be stopped intermittently at any desired position relative to the female mold by sensing the sensor mark positions, so that a continuous injection molding and patterning can be attained at the same time. In the continuous molding and patterning machine as described above, a wound up decorative pattern roll supplying device and a heating device are usually provided. In both the prior art molding machines, however, a rigid plate-shaped heating plate is driven by an air cylinder along a pair of straight linear rails to and from a space formed between the two mated molds.

In addition, as a third prior art example, Japanese Published Unexamined (Kokai) Patent application No. 5-269789 discloses a compact simultaneous injection molding and patterning machine such that a mechanism for feeding a heating plate is accommodated underground by digging a hole under the injection molding machine.

In the above-mentioned prior art simultaneous injection molding and patterning machine, however, since the heating body of the heating device used to heat the decorative pattern sheet is rigid and further large in size (because an electric heater is buried in a metal board). Further since the heating body must be moved away from the molds when the molds are clamped, a large refuge space is required for the heating device (at which the heating device is not heated). This is because it is mechanically easy to move the heating body in a straight line or in parallel from the heat position (at which the heating device is turned on) and to the non-heat position (at which the heating device is turned off) or vice versa.

With the advance of the sizes of the molded products, however, since the size of the heating body increases, there arises a problem in that a large space is inevitably required for refuging the heating device to the non-heat position, with the result that a large installation space is required for the simultaneous injection molding and patterning machine.

In more detail, in the case of the first and second prior art machines, when the heating body is moved to the non-heat position provided over the machine, a high ceiling space is required. Further, when the large and heavy heating body is moved vertically between the heat position and the non-heat position, a large driving power is required and thereby a large driving installation is necessary, with the result that the moving speed of the heating body becomes slow. On the other hand, when the heating body is moved to the rear side of the injection and patterning machine in the horizontal direction, some projecting parts of the heating body obstruct the maintenance of the molding machine. In addition, there exists another problem in that a large mechanism is necessary to support the heating body.

Further, in the third prior art molding and patterning machine in which the heating body is buried underground, although the space can be somewhat reduced on the ground, an additional work for digging a hole underground is required. On the other hand, when the molding and patterning machine is installed at a second floor or higher, it is impossible to dig a hole for accommodating the heating body.

SUMMARY OF THE INVENTION

With these problems in mind, therefore, it is an object of the present invention to provide a simultaneous injection molding and patterning apparatus provided with a compact heating device, and a simultaneous injection molding and patterning method, in which the heating surface of the heating body is not moved in parallel or in a straight line when moved from the heat position to the non-heat position or vice versa. That is, the heating body is moved away from a space between the two mated molds in such a way that the heating position (the mated molds are open) of the heating surface of the heating body is not parallel to the non-heating position (the mated molds are closed).

To achieve the above-mentioned object, the present invention provides a heating device used for a simultaneous injection molding and patterning method such that: a decorative pattern sheet is interposed between a pair of mutually opposing molds:mold A formed with a vent and mold B formed with an injection gate; the decorative pattern sheet is heated and softened by the heating device; the decorative pattern sheet is brought into tight contact with a cavity surface of the mold A on the basis of a pressure difference caused by exhaustion of the mold A through the vent; and a molten resin is injected into the molds through the injection gate to mold a product patterned on the basis of the decorative pattern sheet, wherein the heating device comprises: a heating body for supplying heat to the decorative pattern sheet; and heating body moving means for moving the heating body between a heating position at which the heating body is confronted with the decorative pattern sheet to heat and soften the decorative pattern sheet and a non-heating position at which the heating body is moved away from a space between a pair of the molds, in such a positional relationship that the heating position of a heating surface of the heating body is not parallel to the non-heating position of the heating surface of said heating body.

Further, the present invention provides a simultaneous injection molding and patterning apparatus for molding a product and patterning the molded product by use of a decorative pattern sheet simultaneously, having: a mold A formed with a vent; a mold B formed with an injection gate; a heating device for heating and softening the decorative pattern sheet interposed between a pair of the mutually opposing molds A and B; and injection molding means for bringing the decorative pattern sheet into tight contact with a cavity surface of the mold A on the basis of a pressure difference caused by exhaustion of the mold A through the vent, clamping the two molds, and injecting a molten resin into the molds through the injection gate for injection molding; wherein the heating device comprises: a heating body for supplying heat to the decorative pattern sheet; and heating body moving means for moving the heating body between a heating position at which the heating body is confronted with the decorative pattern sheet to heat and soften the decorative pattern sheet and a non-heating position at which the heating body is moved away from a space between a pair of the molds, in such a positional relationship that the heating position of a heating surface of said heating body is not parallel to the non-heating position of the heating surface of the heating body.

Further, the present invention provides a simultaneous injection molding and patterning method such that: a decorative pattern sheet is interposed between a pair of mutually opposing mold A formed with a vent and mold B formed with an injection gate; the decorative pattern sheet is heated and softened by the heating device; the decorative pattern sheet is brought into tight contact with a cavity surface of the mold A on the basis of a pressure difference caused by exhaustion of the mold A through the vent; and a molten resin is injected into the molds through the injection gate to mold a product patterned on the basis of the decorative pattern sheet, wherein the heating device comprises: a heating body for supplying heat to the decorative pattern sheet; and heating body moving means for moving the heating body between a heating position at which said heating body is confronted with the decorative pattern sheet to heat and soften the decorative pattern sheet and a non-heating position at which the heating body is moved away from a space between a pair of the molds, in such a positional relationship that the heating position of a heating surface of the heating body is not parallel to the non-heating position of the heating surface of the heating body.

In the simultaneous injection molding and patterning apparatus having a heating device according to the present invention, the decorative pattern sheet is interposed between the mold A having the vent and the mold B having the injection gate; after the decorative pattern sheet has been heated and softened by the heating device, the mold A is exhausted through the vent to bring the decorative pattern sheet into tight contact with the cavity surface of the mold A for molding the decorative pattern sheet; and after that, the two mated molds are clamped and a molten resin is injected into the clamped molds.

Further, since the heating body of the heating device is composed of at least one partial rigid heating element, it is possible to move the heating device in non-parallel positional relationship between the heating position (to heat the decorative pattern sheet) and the non-heating position (to clamp the molds).

Further, since the heating body of the heating device is composed of a plurality of partial heating elements and linked with each other bendably, the heating body can be moved under bending conditions between the heating position and the non-heating position.

In the simultaneous injection molding and patterning apparatus having the heating device according to the present invention, the molding process is composed of the following process: the decorative pattern sheet is interposed between the mold A having the vent hole and the mold B having the injection gate; the decorative patterning sheet is heated and softened by the heating device; the heating body is moved away from a space formed between the two mated molds; the decorative pattern sheet is brought into tight contact with the cavity surface of the mold A by a pressure difference caused by the exhaustion of the mold A through the vent; the two molds are clamped and a molten resin is injected into the molds through the injection gate; and the molten product onto which the decorative pattern has been formed is removed from the non-clamped molds.

In the heating device according to the present invention, since the heating device is composed of at least one rigid partial heating element, and further since the heating body is moved in such a positional relationship that the heating position of a heating surface of the heating body is not parallel to the non-heating position, the heating body can be moved between the heating position and the non-heating position non-linearly, with the result that the non-heating position of the heating device can be freely determined at any desired position, while reducing the installation space of the apparatus.

Further, when the heating body is composed of a plurality of rigid partial heating elements, since the heating body can be bent when being moved between the heating position and the non-heating position, it is possible to further reduce the installation space of the apparatus.

DETAILED DESCRIPTION OF THE EMBODIMENTS

With reference to the attached drawings, the embodiments of the heating device and the simultaneous injection molding and patterning apparatus and method according to the present invention will be described in detail hereinbelow in the order of the molding process. Here, the feature of the present invention resides in the heating device of the simultaneous injection molding and patterning apparatus, and therefore the elements or portions other than the heating device is basically the same as with the case of the conventional simultaneous injection molding and patterning apparatus.

Figure 1:
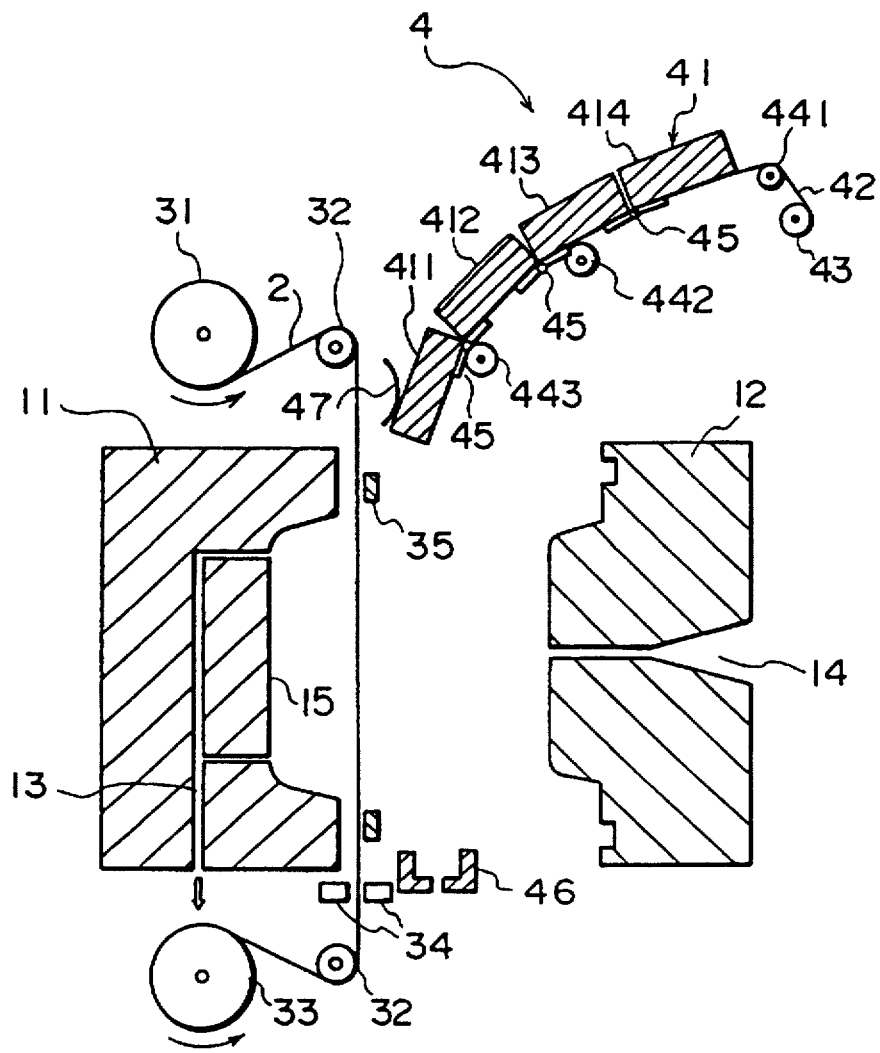
FIG. 1 is a cross-sectional view showing a first embodiment of the simultaneous injection molding and patterning apparatus having the heating device according to the present invention.

FIG. 1 shows a first embodiment of the simultaneous injection molding and patterning apparatus having the heating device according to the present invention.

In FIG. 1, a decorative pattern sheet 2 is continuously supplied from a supply (let-out) roll 31 via a feed roller 32 to a space formed between a first mold (referred to as mold A, hereinafter)(11) formed with a vent and a second mold (referred to as mold B, hereinafter)(12), and then wound up by a take-up roll 33 after molding process. The decorative pattern sheet 2 is formed with locating sensor marks. Therefore, when a locating sensor 34 detects a sensor mark formed on the decorative pattern sheet, the decorative pattern sheet 2 can be located at an appropriate position relative to the mold A (11). Further, although not shown, the decorative pattern sheet 2 can be positioned in position in the lateral direction perpendicular to the sheet feed (longitudinal) direction by use of the sensor marks and the locating sensor 34. When the decorative pattern sheet 2 is located at any desired position, a clamp 35 pushes the located decorative pattern sheet 2 against a parting surface of the mold A (11) for preparation of vacuum molding. As described above, the process of locating the decorative pattern sheet 2 in position can be completed.

Further, where it is unnecessary to locate the pattern formed on the decorative pattern sheet on the outer shape of the molded product precisely, the location sensor and the sensor marks can be both omitted. In this case, the decorative pattern sheet 2 is moved and then stopped in position manually or by use of a step motor.

Further, in general, the mold A (11) formed with a concave cavity surface 15 is referred to as a female mold, and the mold B (12) formed with a convex cavity surface is referred to as a male mold. However, it is not necessary that the mold A is of concave shaped and the mold B is of convex shaped; that is, there exists the case contrary thereto. The essential point is that the mold A is formed with at least a vent for molding the decorative pattern sheet, and the mold B is formed with an injection gate for introducing a molten resin.

Prior to the description of the decorative pattern sheet heating and softening process and the molding process, the heating device of the present invention will be described hereinbelow.

A heating device 4 provided for the simultaneous injection molding and patterning apparatus according to the present invention is characterized in that a heating body 41 is formed by a plurality of partial heating elements and further the heating surface of the respective partial heating elements is located in such a way as to be different between when located at the heating position (mold unclamped) and when at the non-heating (mold clamped) position.

FIG. 1 shows the status where the heating body 41 is located at the non-heating position. In FIG. 1, the heating body 41 is connected to a flexible carrier 42 on the right side, and the flexible carrier 42 is guided by a guide roller 441 and then a part thereof is wound by an accommodate roller 43. Further, the flexible carrier 42 is a resin film or sheet, a metal sheet, cloth, belt, wire, etc.

The heating body 41 is composed of four partial heating elements 411, 412, 413 and 414. These heating elements are linked with each other by a semi-fixed link member 45 (e.g., hinge) at the two adjoining portions thereof, respectively so that the heating body 41 can be pivotal around a rotary axle of the link member 45, respectively. At the non-heating position, the heating body 41 is supported by two guide rollers 442 and 443, so as not drop downward into contact with the molds A and B by its own weight, that is, or not obstruct the molds A and B to be clamped. Each of the link members 45 links the two heating elements on both sides of the lateral direction thereof, so that there exists no convex portion at the middle portion of the heating body 41 in the lateral direction. Therefore, although the heating body 41 is supported by the guide rollers 442 and 443 on both sides thereof, it is possible to feed the heating body 41 smoothly without interference with the guide rollers 442 and 443.

Further, at the non-heating position, the guide rollers 442 and 443 are so arranged that the partial heating elements are not placed horizontally but arranged in such a way that the lowermost heating element 441 is located at the lowermost position and the uppermost heating element 414 is located at the uppermost position by describing a circular arc shape toward and along the flexible carrier 42. Therefore, since a tension is applied to the partial heating elements and the flexible carrier 42 by the own weight thereof, when the flexible carrier 42 is loosened, it is possible to drop the partial heating elements to the heat position by the own weight thereof.

Further, as the partial heating elements used as the heating body of the heating device according to the present invention, a small heating body constructed by a single heating board or flexible flat sheet like heating element can be used. Here, the flexible flat heating element is a resistance wire, a heat generating resistance circuit formed by etching a metal foil (e.g., aluminum), a conductive resin sheet formed by mixing conductive metal powder with a flexible resin, a glass cloth covered or impregnated with the conductive resin and further covered with a flexible resin or asbestos sheets, etc. As the above-mentioned flexible resin, silicone rubber is used in general from the standpoint of the heat resistance and the flexibility.

Further, in the above-mentioned heating device, when a heat insulating sheet is laminated on the reverse surface (opposite to the heating surface) of each of the heating elements, it is possible to reduce the generated heat energy loss effectively.

Figure 2:
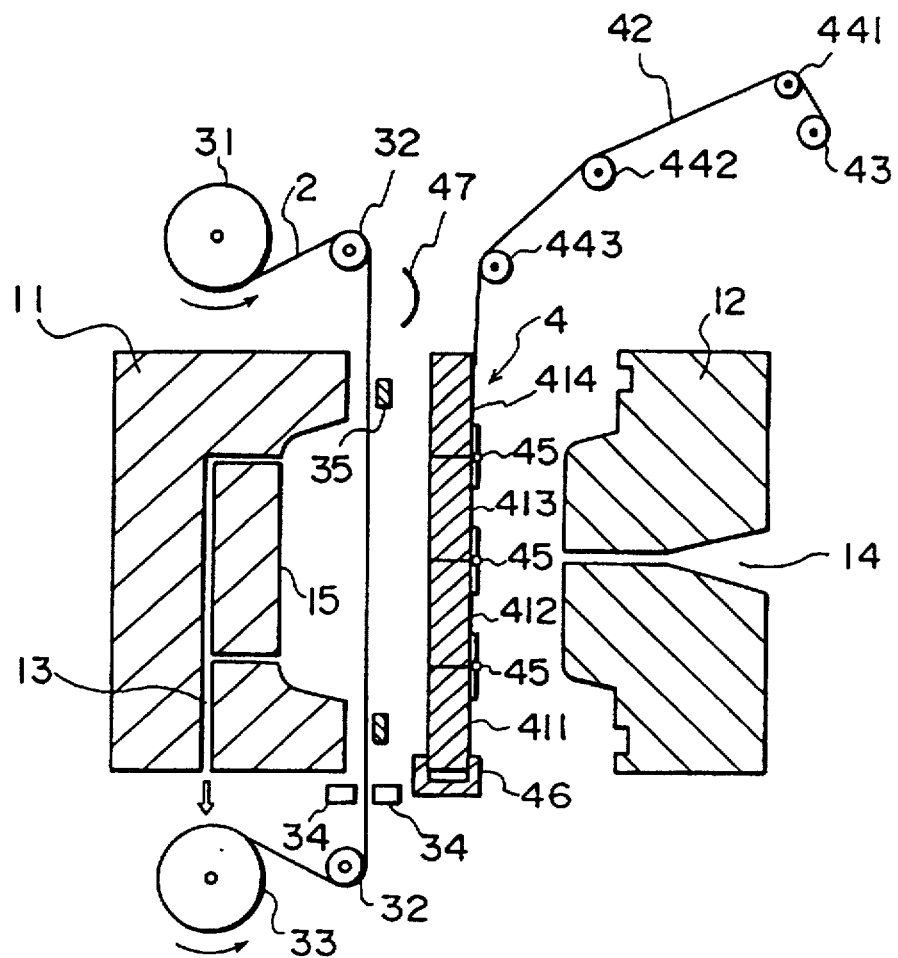
FIG. 2 is a similar cross-sectional view showing the heating body shown in FIG. 1, in which the heating body is located at the heating position.

The decorative pattern sheet is heated and then softened by use of the heating device having the heating body constructed by the partial heating elements as described above. In more detail, the heating body 41 is moved from the upward non-heating position over the mold B (12) as shown in FIG. 1 to the heating position as shown in FIG. 2. The heating body 41 can be moved to the heating position by unwinding the flexible carrier 42, that is, by rotating the accommodate roller 43 counterclockwise by a predetermined rate. The heating body 41 can be moved downward beginning from the lowermost partial heating element 411 by its weight down to a support member 46. Under these conditions, the heating body 41 is fixed by the support member 46, so that the heating body and the decorative pattern sheet are kept at the heating position with an appropriate distance between them.

Further, a brake member 47 is composed of a plurality of rollers or is a plate member of excellent slidability (processed by a fluorine resin). The brake member 47 serves to securely prevent the partial heating elements from being brought into contact with the sensor 34 and the decorative pattern sheet 2 when the partial heating elements are being moved from the non-heating position to the heating position by changing the movement direction from the obliquely downward direction to the right downward direction at the guide roller 443. However, it is possible to eliminate the brake member 47, as far as the heating elements will not interfere with the sensor 34 and the decorative pattern sheet 2, due to the positional relationship among the guide rollers 443, the size of the partial heating elements, the non-heating position, the heating position, etc.

Further, when a light-weight partial heating elements such as the flexible flat heat generating element are used, it is also preferable to use such a support member 46 that after the heating body 41 has been supported, the heating body 41 can be moved slightly downward to apply a downward tension to the heating body 41 so that the heating surface can be further flattened. Further, when the own weight of the heating body is too light and thereby the downward movement thereof is not stable, it is also preferable to attach a weight at the lower end of the heating body. Further, it is also possible to eliminate the support member 46, as far as the heating body 41 can be located and stopped securely in position in parallel to the decorative pattern sheet, due to the own weight of the heating body 41 or the own weights of both the heating body 41 and the weight or by use of another appropriate fixing means.

As described above, the decorative pattern sheet can be heated up to a predetermined temperature for softening, by moving and locating the heating body 41 to the heating position at which the decorative pattern sheet can be heated and softened.

Further, when the heating body 41 is composed of a plurality of the partial heating elements, since the heating body can be pivoted or bent between at least two partial heating elements, it is possible to bent the heating body into a polygonal shape so as to match the decorative pattern sheet also bent into a polygonal shape in accordance with the outer shape of the molded product, in addition to the ordinary method as shown in FIG. 1 (in which a simple flat decorative pattern sheet is heated by the flat heating body).

Further, in FIG. 2, the decorative pattern sheet 2 is heated without being in contact with the heating body 41. Without being limited only thereto, it is also possible to bring the heating body 41 into contact with the decorative pattern sheet 2, as far as the flatness of the heating body 41 is sufficiently high on the decorative pattern sheet side. In this case, since the thermal efficiency is high, it is possible to complete the heating process in a short time.

Figure 3:
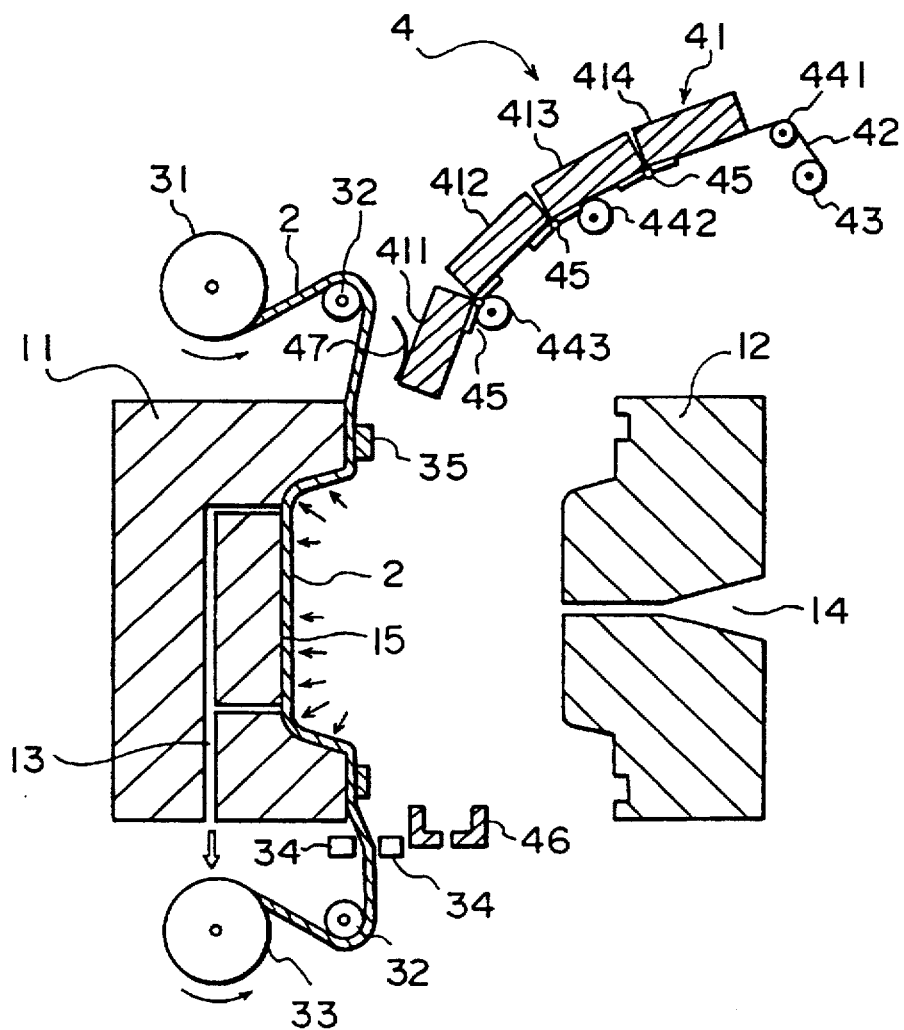
FIG. 3 is a similar cross-sectional view showing the process of bringing a decorative pattern sheet into tight contact with the cavity surface of the mold.

After that, as shown in FIG. 3, the cavity of the mold A is exhausted through a vent 13 with a vacuum source (not shown) connected to the vent 13. Then, the decorative pattern sheet 2 can be brought into tight contact and fitted with the outer surface of the mold A due to a pressure difference between the exhaustion pressure and the atmospheric pressure, so that the molding process of the decorative pattern sheet 2 (preliminary forming) can be completed.

In the above-mentioned timing of the heating (softening) and the vacuum molding, it is possible to adopt such another method that the molding of the decorative pattern sheet against the parting surface of the mold A and the heating of the decorative pattern sheet are effected roughly at the same time. In more detail, after the decorative pattern sheet has been stretched out on the parting surface of the mold A, when the mold A is being exhausted to suck the decorative pattern sheet, the heating body is moved to the predetermined position confronted with the parting surface of the mold A and then the decorative pattern sheet is heated for softening. In this method, since the decorative pattern sheet can be heated and thereby softened and further molded along the cavity of the mold A simultaneously, it is possible to shorten the cycle time of the molding and patterning process.

After that, the heating body 41 of the heating device 4 is returned to the non-heating position as shown in FIG. 1. To move the heating body 41 to the non-heating (refuge) position, first the support member 46 is operated to release the heating body 41 therefrom, and then the flexible carrier 42 for supporting the heating body 41 from above is wound back by a predetermined rate by rotating the accommodate roller 43. The flexible carrier 42 is wound around the accommodate roller 43 being guided by the guide rollers 441, 442 and 443. On the other hand, the heating body 41 is also guided by the flexible carrier 42, and moved to the upward non-heating position being guided by the guide rollers 443 and 442 and further being bent at the respective link members 45. At this time, the brake member 47 can prevent the heating body from being brought into contact with the clamp 35 and the decorative pattern sheet 2 when the moving direction is changed by the guide roller 443.

As described above, in the heating device according to the present invention, although the heating surface of the heating device is vertical at the heating position as shown in FIG. 2, the heating surface of the heating device is oblique right side up (although not horizontal) at the non-heating position as shown in FIG. 1, so that it is possible to realize such a positional relationship that the heating position of the heating surface of the heating body is not parallel to the non-heating position. By determining the heating surface relationship as described above, it is possible to economize the installation space of the molding apparatus, in which the heating device is refuged at the non-heating position, as compared with when the heating body is moved in a straight line directly upward or downward direction or rightward or leftward direction. In addition, since the heating body is composed of a plurality of partial heating elements and further since the two adjoining partial heating elements are linked with each other so as to be pivotal thereat, the heating body can be bent when moved between the heating position and the non-heating position, thus economizing the movement space of the heating body.

Figure 4:
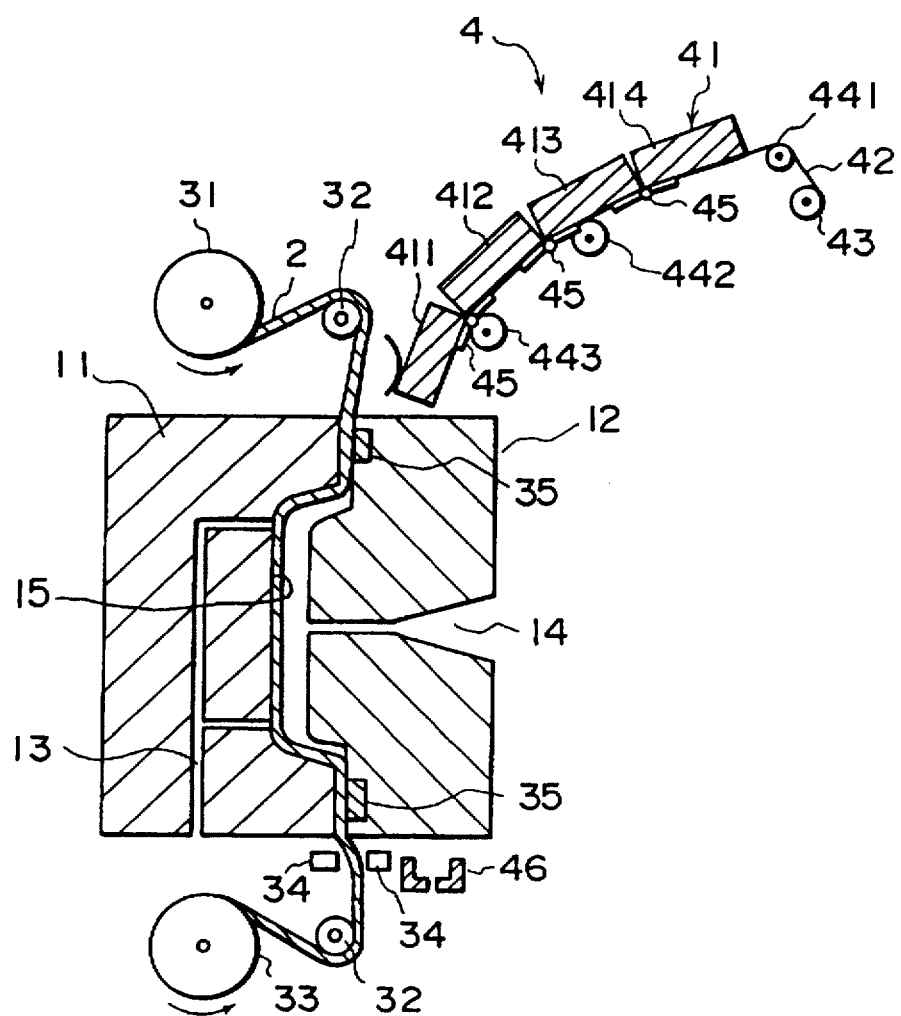
FIG. 4 is a similar cross-sectional view showing the process of clamping the molds.
Figure 5:
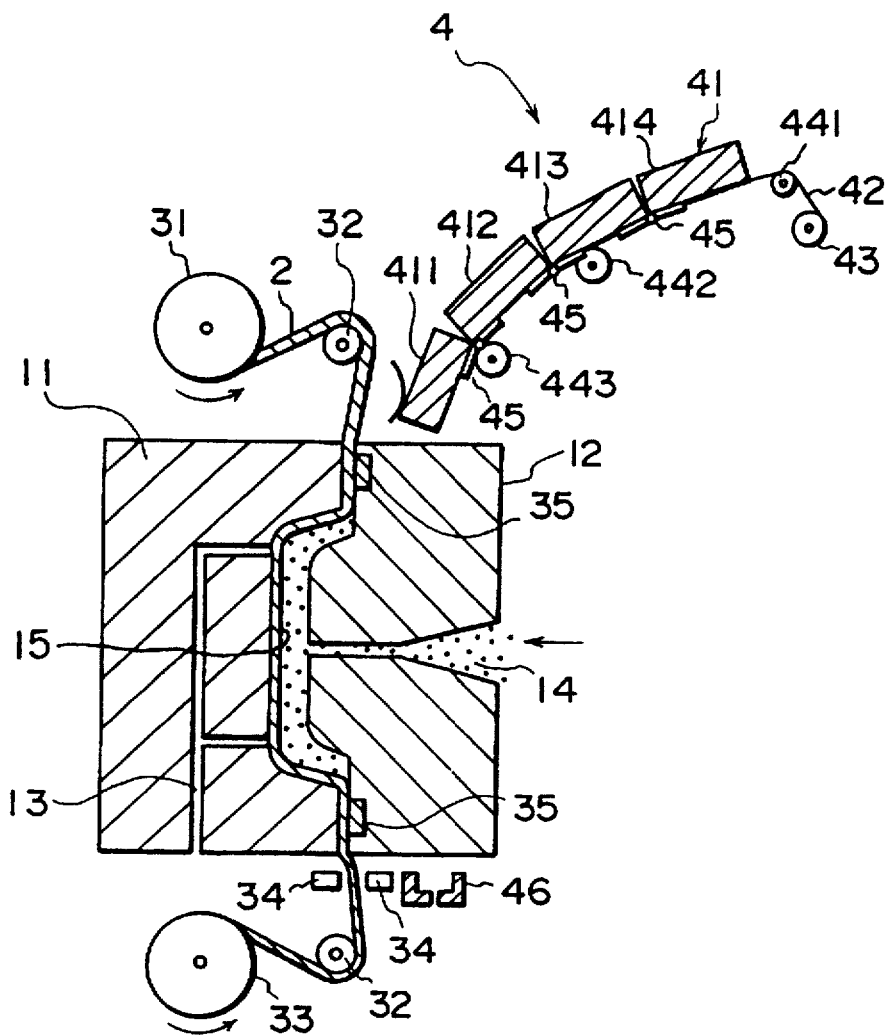
FIG. 5 is a similar cross-sectional view showing the process of injecting a melted resin into the mold.

After the heating body been moved to the non-heating position as shown in FIG. 4, the two molds A and B are clamped. Further, as shown in FIG. 5, a molten resin is injected into the molds A and B through an injection gate 14. A predetermined time has elapsed, the two molds A and B are opened, so that a molded product on the outer surface of which a pattern is formed in accordance with the decorative pattern sheet can be removed from the two molds A and B.

As described above, it is possible to obtain a molded product formed with a decorative pattern in accordance with the method by use of a simultaneous injection molding and patterning apparatus having the heating device according to the present invention.

In the heating body according to the present invention as described above, although the heating body is composed of a plurality of partial heating elements, it is also possible to construct the heating device by a single heating element; that is, a signal rigid heating element. This is because the gist of the present invention is to provide a heating device in such a way that the heating surface thereof cannot be located in a parallel positional relationship between the heating position and the non-heating position to economize the installation space of the heating device between the two positions. The above-mentioned single rigid heating body will be described in further detail hereinbelow.

Figure 6:
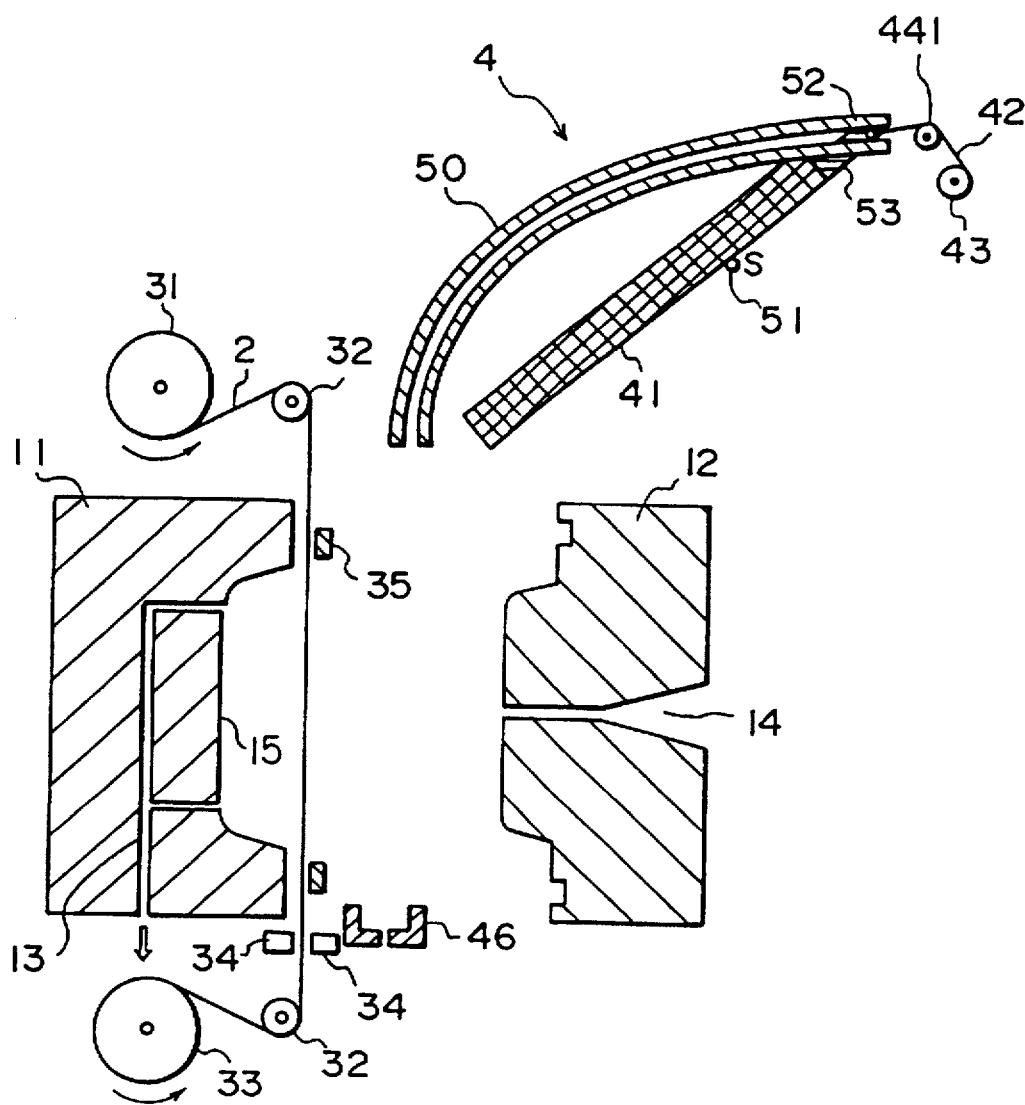
FIG. 6 is a cross-sectional view showing a second embodiment of the simultaneous injection molding and patterning apparatus having the heating device according to the present invention.

FIG. 6 shows a second embodiment of the heating device according to the present invention, in which the heating body is formed of a single heating body or a signal partial heating element. In FIG. 6, the heating body 41 is located at the non-heating position.

The heating body 41 is connected to a rigid support member 53 extending obliquely upward. The upper end of the rigid support member 53 is connected to the flexible carrier 42. The flexible carrier 42 is guided by a guide roller 441, and a part thereof is wound around the accommodate role 43. The flexible carrier 42 is the same as with the case of the first embodiment shown in FIG. 1.

A slide axle 52 is attached to the upper end of the support member 53 of the heating body 41, and this slide axle 52 is engaged with a recessed groove formed in a guide rail 52. In addition, the heating body 41 is supported by a movable guide roller 51 so as not to be hung down by its own weight. As a result, it is possible to keep the heating body 41 at the non-heating position where the heating body 41 will not interfere with the molds A and B when clamped or not clamped, as shown in FIG. 6.

Further, at the non-heating position as shown in FIG. 6, the heating body 41 is supported by the movable guide roller 51 on the right side of the gravity center of the heating body 41. In other words, the gravity center of the heating body 41 is located on the lower side (free end side of the heating body 41) away from the contact position between the heating body 41 and the movable guide roller 51. Further, this positional relationship between the gravity center of the heating body and the movable guide roller 51 can be kept between the non-heating position and the heating position. Accordingly, since a tension is applied to the flexible carrier 42 by its weight of the heating body 41, when the flexible carrier 42 is loosened, the heating body can drop down to the heating position by the own weight thereof.

Figure 7:
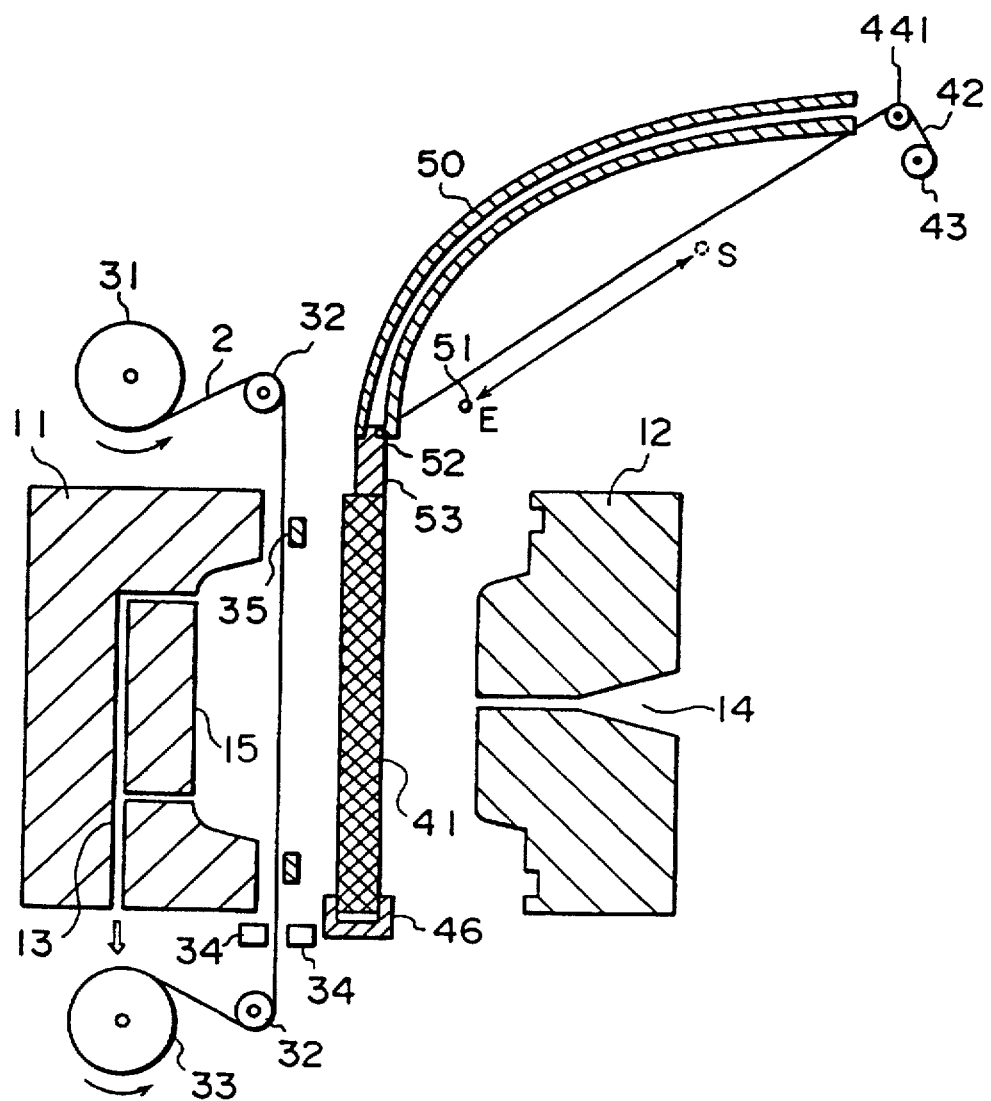
FIG. 7 is a similar cross-sectional view showing the heating body shown in FIG. 6, in which the heating body is located at the heating position.
Figure 8:
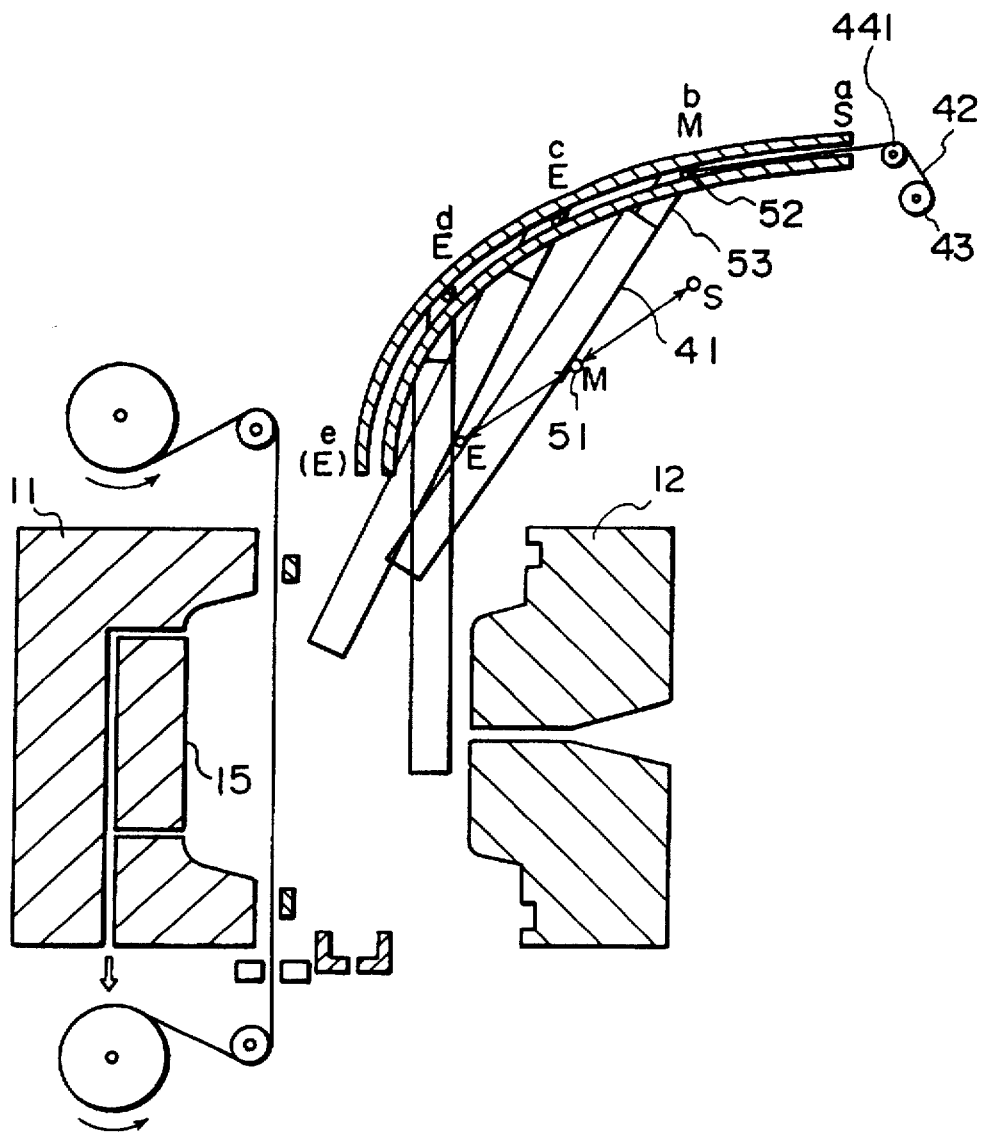
FIG. 8 is a similar cross-sectional view showing the movement locus of the heating body between the non-heating position shown in FIG. 6 and the heat position shown in FIG. 7.

FIG. 7 shows the status where the above-mentioned single rigid heating body 41 is moved to the heating position, and FIG. 8 shows the status where the heating body 41 and the movable guide roller 51 are both moved during the movement process from the non-heating position to the heating position.

In FIG. 7, the heating position of the heating body can be determined by the position of the slide axle 52. That is, the heating body is positioned in the vertical direction being hung down from the slide axle 52 by its weight. On the other hand, the vertical and horizontal positions of the slide axle 52 can be determined by the guide rail 50 (for guiding the slide axle 52) and the rewinding rate of the flexible carrier 42 connected with the support member 53 (for supporting the heating body 41 and having the slide axle 52).

Further, since the guide rail 50 is fixedly provided at such a position as not to sandwiched between the two clamped molds A and B or not to interfere with a tie plate or tie bars for clamping the two molds A and B. Therefore, the support member 53 serves to extend the heating body from the lowermost end of the guide rail 50 to the desired heating position.

Further, in the same way as with the case of the first embodiment shown in FIG. 2 (the heating body is composed of a plurality of partial heating elements), the support member 46 is fixed to support the lower end of the heating body so that the heating body and the decorative pattern sheet can be kept at an appropriate distance. Or else, it is also possible to eliminate the support member 46 according to the situation.

With reference to FIG. 8, the movement process from the non-heating position (at which the heating body is located over the mold B as shown in FIG. 6) to the heating position (at which the heating body is located between the two molds A and B as shown in FIG. 7) will be explained. In FIG. 8, although the non-heating (start) position and the heating (end) position are both not shown, the position [a] indicates the start position and [e] indicates the end position of the heating body, respectively.

The slide axle 52 moves in the order of [a], [b], [c], [d] and [e] when the heating body 41 moves from the non-heating position to the heating position. Further, [S], [M] and [E] described under the [a] or other indicate the corresponding upper end positions of the movable guide roller 51 moved in relation to the slide axle positions.

The heating body 41 is first located at the non-heating position. Under these conditions, the heating body 41 is supported by the slide axle 52 located at position [a] of the guide rail and the movable guide roller 51 located at position [S]. Further, the heating body 41 is connected with the flexible carrier 42 via the support member 52.

The heating body is moved from the non-heating position by rotating the accommodate roller 43, that is, by unwinding the flexible carrier 42 by a predetermined rate. When the flexible carrier 42 is wound back, the heating body 41 is moved in the vertically downward direction by its weight.

When the slide axle 52 is moved to position [b], the movable guide roller 51 moves from [S] to [M] together with the slide axle 52. When the slide axle 52 is moved to position [c], the movable guide roller 52 moves from [M] to [E] together with the slide axle 52. After that, the movable guide roller 51 is not moved and stops at [E]. On the other hand, the slide axle 52 moves from [c] to [d]. During this process, the heating body 41 goes into a space formed between the two molds A and B by changing the inclination angle thereof with the fixed movable guide roller 51 as its fulcrum.

Further, although the heating body 41 is located in the vertical direction at positions [d] and [E], it is not necessary that the end point of the movable guide roller 51 is located at this vertical position. This end position of the movable guide roller 51 can be determined on the basis of the various sizes of the molds, the heating body, movable guide roller, etc. and the mutual positional relationship between them. Further, the slide axle 52 further moves from position [d] to final position |e|. During this process, the heating body 41 is moved away from the movable guide roller 51, and hung down from the slide axle 52 by its own weight toward position |e|. At position |e| of the slide axle 52, the heating body 41 will not contact with the movable guide roller 51. Therefore, the position of the movable guide roller 52 is indicated by |(E)| in correspondence to the position |e| of the slid axle 52.

The movable guide roller 51 can be moved in a different method. For instance, in the same way as with the case where the slide axle 52 is moved along the guide rail 50, another guide rail formed with a rack is provided to guide another slide axle of the movable guide rail 51 and further a pinion attached to the slide axle end is driven by a motor in such a way that the pinion can be moved along the rack of the guide rail. Further, in the above description, although the movable guide rail is moved along a straight locus at a constant speed, without being limited only thereto, it is possible to move the movable guide roller along a curved locus at a nonconstant speed with the use of a microcomputer, for instance.

Further, the mechanism by use of a rack and a pinion driven by a motor can be applied to the movement operation of the slide axle 52 along the guide rail 50. When the flexible carrier is used, it is necessary to always apply a tension to the flexible carrier by its own weight of the heating body so that the heating body can be moved from the non-heating position to the heating position whenever the flexible carrier is wound back. In the case where the lack and pinion mechanism is used, however, since the heating body can be driven from the non-heating position to the heating position forcedly, the flexible carrier 42 is unnecessary. Further, it is also not necessary to maintain the positional relationship between the gravity center of the heating body 41 and the motion of the flexible guide roller 51.

Further, the movement by the lack and pinion mechanism can be applied to move the heating body composed of a plurality of partial heating elements from the non-heating position to the heating position. In this case, in FIG. 1, for instance, the guide rollers 442 and 443 are used as they are; the support member 53 having the slide axle 52 (as shown in FIG. 6) is linked with the upper end of the partial heating element 414 by use of the link member 53 (as used to link the partial heating elements); the guide rail 50 is provided as a guide groove along the guide rollers 441, 442 and 443; and further a pinion is attached to the slide axle 52 and a rack is formed along the guide rail 50. In this case, the motor is used as a drive source for driving the partial heating elements, instead of the flexible carrier 42.

Further, as the means for holding the respective heating elements at the non-heating position, it is also possible to provide a plurality of slide plates bent upward into a convex shape, instead of the guide rollers 442 and 443.

As described above, after the heating body has been moved from the non-heating position to the heating position, the heating body is heated to effect the simultaneous injection molding and patterning of a molding product.

Further, when the heating body 41 is moved from the heating position to the non-heating position in the reverse direction, the flexible carrier 42 is taken up by the accommodate roller 43 in the opposite way as the above-mentioned operation. That is, the slide axle 52 is moved in the order of [e], [d], [c], [b] and [a]. Further, since the flexible guide roller 51 is moved from [E] to [S], when the slide axle 52 reaches [c] and then moves from [c] to [a], the heating body 41 can be returned to the non-heating position for refuge or standby.

As described above, in the case of the heating device having a single heating body according to the present invention, although the heating surface of the heating device is vertical at the heating position as shown in FIG. 7, the heating surface of the heating device is oblique right side up (although not horizontal) as shown in FIG. 6, so that it is possible to realize such a positional relationship that the heating surface is not parallel between at the heating position and at the non-heating position. By determining the heating surface relationship as described above, it is possible to economize the installation space in which the heating device can be moved to the non-heating position, as compared with when the heating body is moved in a straight line in the upward or downward direction or in the rightward or leftward direction.

In the above description, the heating body composed of a plurality of heating elements and by a single rigid heating body have been explained with respect to the relationship between the heating position and the non-heating position or the operation between the two positions and the mechanism thereof. However, the important point of the present invention is that the heating position of heating surface of the heating body is not parallel to the non-heating position. In other words, the mechanism or the construction of moving the heating body between the two positions is not limited to only the above-mentioned embodiments.

Further, the surface shape of the heating surface (facing the decorative pattern sheet) of the heating body 41 can be formed into any shapes such a flat surface, a rough surface, a convex or concave surface, etc. in correspondence to the inner surface of the cavity formed in the mold A (11) (which corresponds to the outer shape of the molded product).

Further, in the above-mentioned embodiments, the decorative pattern sheet 2 is heated by the heating body 41 directly (contact type) or indirectly (non contact type). In the direct heating, the heating body 41 is brought into contact with the surface of the decorative pattern sheet 2. In the case of the indirect heating, the heating body 41 is positioned a distance away from the decorative pattern sheet as shown in FIG. 2 to heat the patter sheet by thermal radiation or induction heating by an electromagnetic filed.

Further, in the above-mentioned embodiments, the non-heating position of the heating body is determined over the mold. In this case, there exists such an advantage that the heating body can be moved downward by its own weight. Without being limited only thereto, however, it is possible to determine the non-heating position at any positions, as far as the non-parallel positional relationship can be obtained between the two positions; that is, where the space-saving object of the present invention can be attained.

Further, where the non-heating position of the heating body is determined in the lateral direction as with the case of the another embodiment as described later, since the heating body cannot be moved by use of its own weight, hydraulic or pneumatic power is used instead.

Figure 9:
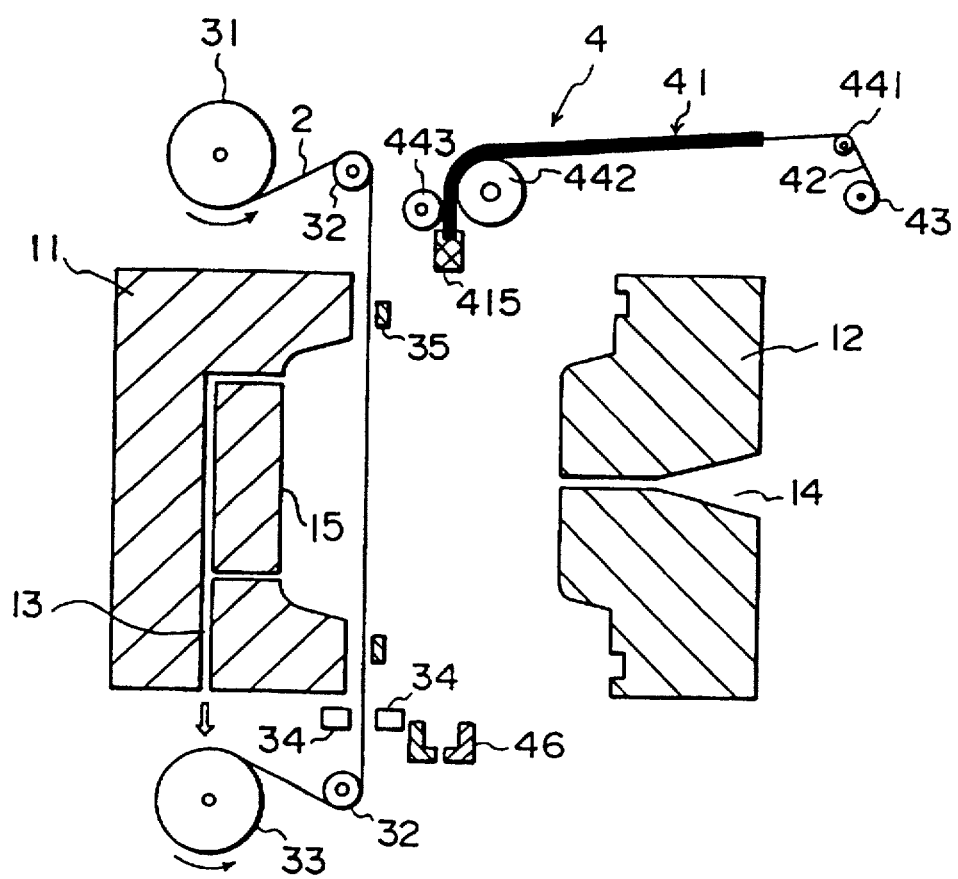
FIG. 9 is a cross-sectional view showing a third embodiment of the simultaneous injection molding and patterning apparatus having the heating device according to the present invention.

FIG. 9 shows a third embodiment of the simultaneous injection molding and patterning apparatus according to the present invention. The feature of this embodiment is to use a flexible flat heat generating body is used as the heating body 41.

FIG. 9 shows the status where the heating body 41 is located at the non-heating position. In FIG. 9, the heating body 41 is connected to a flexible carrier 42 on the right side, and the flexible carrier 42 is guided by a guide roller 442 and then a part thereof is wound by an accommodate roller 43. Further, the flexible carrier 42 is a resin film or sheet, a metal sheet, cloth, belt, wire, etc.

The heating body 41 is bent in contact with the guide roller 442. Further, a weight 415 is attached to the lower end of the heating body 41 to direct the heating body 41 downward in the vertical direction from the guide roller 442. Further, when the flexibility of the heating body 41 is low to such an extent that the heating body 41 cannot be directed downward in the vertical direction only by its own weight and the weight 415, the heating body 41 is guided forcibly downward by urging it. On the other hand, when the flexibility of the heating body is sufficient, it is possible to omit the weight 415.

Further, as the flexible flat heating generating body used as the heating body of the heating device according to the present invention, there are a resistance wire, a heat generating resistance circuit formed by etching a metal foil (e.g., aluminum), a conductive resin sheet formed by mixing conductive metal powder with a flexible resin, a glass cloth covered or impregnated with the conductive resin and further covered with a flexible resin or asbestos sheets, etc. As the above-mentioned flexible resin, ordinary silicone rubber is often used from the standpoint of the heat resistance and the flexibility.

Further, in the above-mentioned heating device, when a heat insulating sheet is laminated on the reverse surface (opposite to the heating surface) of the heating body, it is possible to prevent generated heat loss effectively.

Figure 10:
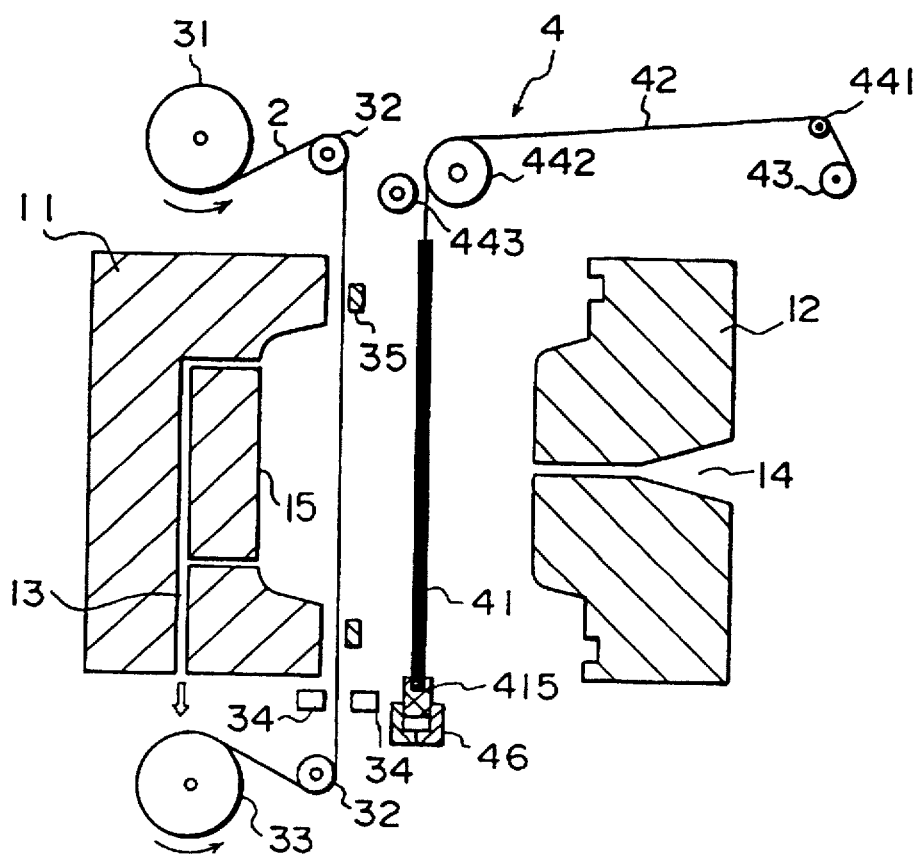
FIG. 10 is a cross-sectional view showing the same heating body shown in FIG. 9, in which the heating body is located at the heating position.

The decorative pattern sheet is heated and then softened by use of the heating device having the heating body constructed by the heating body as described above. In more detail, the heating body 41 is moved from the upward non-heating position over the mold B (12) as shown in FIG. 9 to the heating position as shown in FIG. 10. The heating body 41 can be moved by unwinding the flexible carrier 42, that is, by rotating the accommodate roller 43 counterclockwise by a predetermined rate. The heating body 41 is moved downward by its weight and the weight 415 and along the two guide rollers 442 and 443 down to a support member 46. Under these conditions, the heating body 41 is fixed by the support member 46, so that the heating body can be kept an appropriate distance away from the decorative pattern sheet.

Further, it is also preferable to use such a support member 46 that after the heating body 41 has been supported, the heating body 41 can be moved slightly downward to apply a downward tension to the heating body 41 so that the heating surface can be further flattened. Further, it is also possible to eliminate the support member 46, as far as the heating body 41 can be located and stopped securely in position in parallel to the decorative pattern sheet, due to the own weight of the heating body 41 or the addition of the own weight and the weight 415 or by use of another appropriate fixing means.

After the heating body 41 has been moved to the heating position as described above, the decorative pattern sheet is heated up to a predetermined temperature for softening.

Further, since the heating body 41 is flexible, it is also possible to deform the decorative pattern sheet into a curved surface or a two-dimensional shape, in addition to the flat shape as shown in FIG. 9. In this case, the heating body formed into a two-dimensional shape corresponding to the decorative pattern sheet is preferably used.

Further, in FIG. 10, the decorative pattern sheet 2 is heated without being in contact in the heating body 41. Without being limited only thereto, it is also possible to bring the heating body 41 into contact with the decorative pattern sheet 2, as far as the flatness of the heating body 41 is sufficiently high on the decorative pattern sheet side. In this case, since the thermal efficiency is high, it is possible to complete the heating process in a short time.

Further, in FIG. 9, the heating position is determined at the a parting surface of the mold A (11). Without being limited only thereto, however, it is also possible to move the pattern sheet 2 to the mold A (11) while heating the decorative pattern sheet. In this case, the guide roller 442 and the upper feed roller 32 are both disposed on the upper side farther away from the positions shown in FIG. 9, and the decorative pattern sheet 2 and the heated heating body 41 are both moved together under opposing condition from the upper position of guide roller 442 and the upper feed roller 32 to the parting surface of the mold A (11).

After that, as shown in FIG. 9, the cavity of the mold A is exhausted through the vent 13 with a vacuum source (not shown) connected to the vent 13. Then, the decorative pattern sheet 2 can be brought into tight contact and fitted with the outer surface of the mold A due to a pressure difference between the exhaustion and the atmospheric pressure, so that the molding process of the decorative pattern sheet 2 can be completed.

After that, the heating body 41 of the heating device 4 is returned to the non-heating position as shown in FIG. 9. To move the heating body 41 to the non-heating position, first the support member 46 is operated to release the heating body 41 therefrom, and then the flexible carrier 42 for supporting the heating body 41 from above is wound back by a predetermined rate by rotating the accommodate roller 43. The flexible carrier 42 is wound around the accommodate roller 43 being guided by the guide rollers 441 and 442. On the other hand, the heating body 41 is also guided by the flexible carrier 42, and moved to the non-heating position being guided by the guide roller 442.

As described above, in the heating body according to the present invention, since the heating body is very thin in thickness and very light in weight, as compared with the conventional heating body (rod heater is buried in a metal board), a small space is sufficient as the refuge not-heating space of the heating device. In addition, when the heating body is taken up around a roller, as with the case where the movable carrier 42 is wound around the accommodate roller, it is possible to further economize the refuge space of the heating body.

Further, in FIGS. 9 and 10, the heating body is located over the mold A formed with the vent and the mold B formed with the injection gate in such a way that the heating surface of the heating body is located roughly in the horizontal plane at the non-heating position but located so as to face the mold parting surface in the vertical plane at the heating position. In addition, the heating body is of bendable type during the movement process between the heating position and the non-heating position. The above-mentioned arrangement of the heating body is preferable from the space economizing standpoint. However, it is also possible to determine the non-heating position at a position away from the heating position upward or downward or rightward and leftward in parallel to the heating surface of the heating body. In this case, it is possible to increase the movement speed of the heating body and thereby to reduce the process time, because the inertial and weight of the heating body can be reduced and thereby and the size of the heating body driving mechanism can be small-sized.

After the heating body been moved to the non-heating position, the two molds A and B are clamped. A molten resin is injected into the molds A and B through the injection gate 14. A predetermined time has elapsed, the two molds A and B are released open, so that a molded product on the surface of which a pattern is formed in accordance with the decorative pattern sheet can be removed from the two molds A and B. As described above, it is possible to obtain a mold formed with a decorative pattern, in accordance with the method by use of a simultaneous injection molding and patterning apparatus having the heating device according to the present invention.

A fourth embodiment to the present invention will be described hereinbelow with reference to FIGS. 11 to 13.

In the afore-mentioned embodiments, the positional relationship of the heating body 41 between the heating position and the non-heating position is such that: the non-heating position is determined at such a position that the heating surface of the heating body 41 is located in a roughly horizontal plane over the mold A (11) having the vent 13 and the mold B (12) having the injection gate 14, and the heating position is determined at such a position that the heating surface of the heating body 41 is located so as to confront with the parting surface of the mold A (11) in a vertical plane. Further, the heating surface direction of the heating body 41 is changed gradually in the movement process between the non-heating position and the heating position.

In this fourth embodiment, however, as explained below, the non-heat (refuge) position of the heating body is determined in the lateral direction of the mold, not over the molds A and B.

A heating device 4 is of a heat board mechanism type provided with a heating body 60 of a heat board and some peripheral devices. It is preferable to install the heating device 4 on the rear side surface (operation console side) of the machine, because the weight of the heating board can be supported easily. FIGS. 11 to 13 show an example in which the heating device 4 is disposed on the rear side surface of the molds.

On the reverse side surface of the molds A (11) and the mold B (12), two guide rails 61 and 62 are arranged in parallel being spaced in the vertical direction so as to extend in the mold engagement direction (horizontal direction). The cross-sectional shape of each of the two guide rails 61 and 62 is of H shape. However, it is of course possible to use other rails of T-shaped or other cross-sectional shape.

Two sliders 63 and 64 are slidably engaged with the two guide rails 61 and 62 so as to be moved along the rails, respectively. A U-shaped box drive frame 65 opened in the travel direction (on the left side in FIG. 11) is mounted between the two sliders 63 and 64. On the other hand, a hydraulic cylinder and piston mechanism 72 is linked with the U-shaped box drive frame 65 on the closed side thereof (the right side in FIG. 11), so that the U-shaped box drive frame 65 can be moved in the horizontal (the right and left) direction by actuating the cylinder mechanism 72. The hydraulic cylinder mechanism is of any of hydraulic and pneumatic types.

Figure 11:
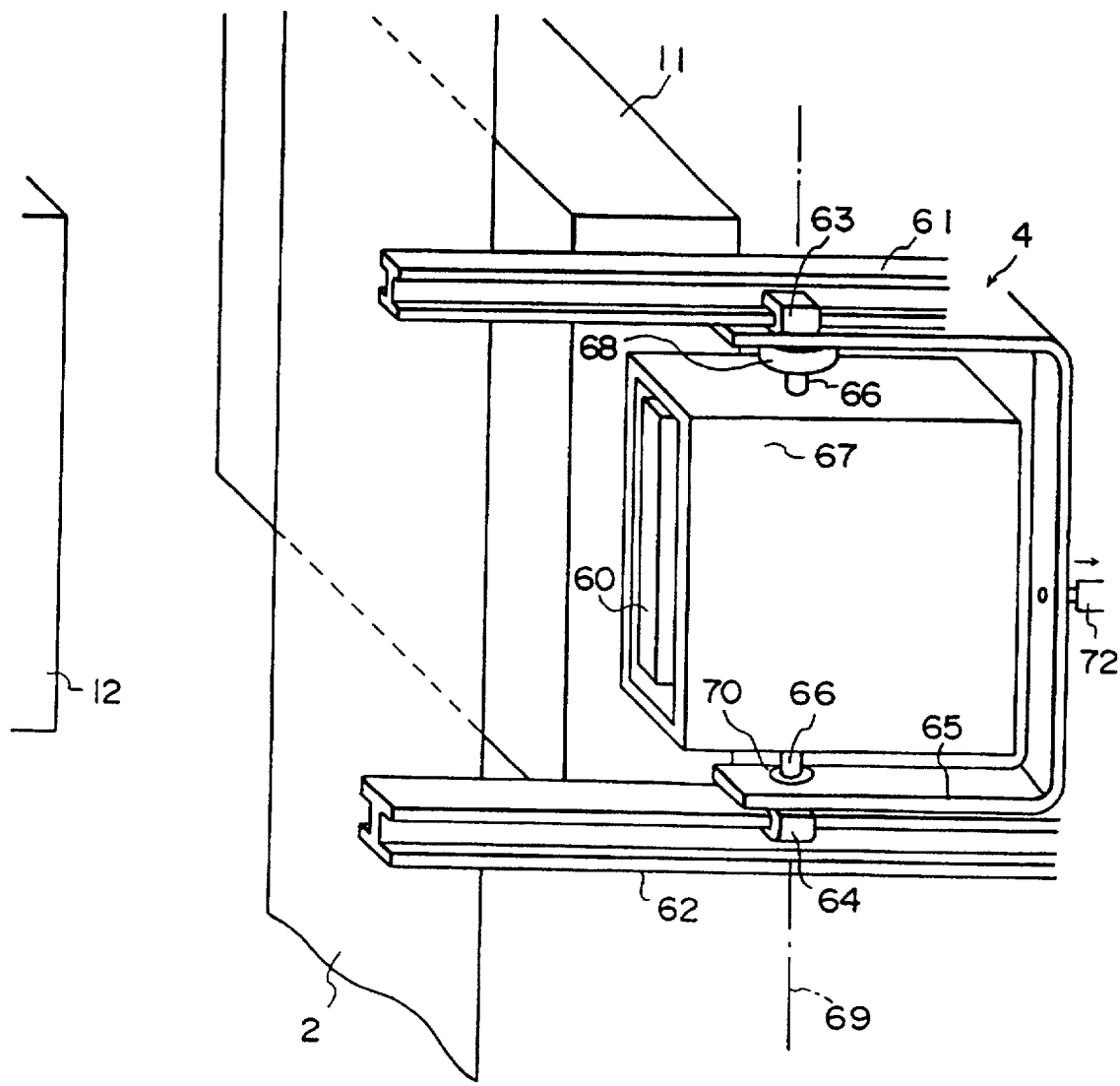
FIG. 11 is a perspective view showing a fourth embodiment of the simultaneous injection molding and patterning apparatus having the heating device according to the present invention, in which the heating body is located at the non-heating position.

Inside of the U-shaped box drive frame 65, a heat board accommodate box 67 is supported by two cylindrical (upper and lower) axles 66 extending in the vertical direction via upper and lower bearings 70, respectively, as shown in FIG. 11, so that the heat board accommodate box 67 can be pivoted around the axles 66. Further, a motor 68 is mounted on the upper axle 66 to pivot the heat board accommodate box 67 relative to the U-shaped box drive frame 65 about the rotative axis 69. Further, the motor 68 can be mounted on the lower axle 66 or both the upper and lower axles 66. The motor 68 can be linked with the axle 66 directly or indirectly via a gear mechanism, belt, etc. As the motor 68, various motors such as servomotor, step motor, etc. can be used. Further, the axles 66 can be driven by electromagnetic or pneumatic power.

Further, it is also preferable to make the guide rails 61 and 62, the sliders 63 and 64, the U-shaped box drive frame 65, the axles 66, the heat board accommodate box 67, etc. of metallic material such as iron, aluminum, titanium, copper, etc.

The inside of the heat board accommodate box 67 is hollow, and the box drive frame 65 is open on the left side in FIG. 11. A flat-shaped heating board (heating body) 60 is housed in the heat board accommodate box 67. The heat board accommodate box 67 is made of a metal or ceramics of high thermal resistance. Instead, it is also preferable to form the heat board accommodate box 67 as a heat insulating structure by laminating a heat insulating material (asbestos, glass fiber, etc.) or as a cooling structure by burying cooling water pipes or heat pipes therewithin, in order to prevent the other portions from being heated by the heating body 60 unnecessarily.

Figure 12:
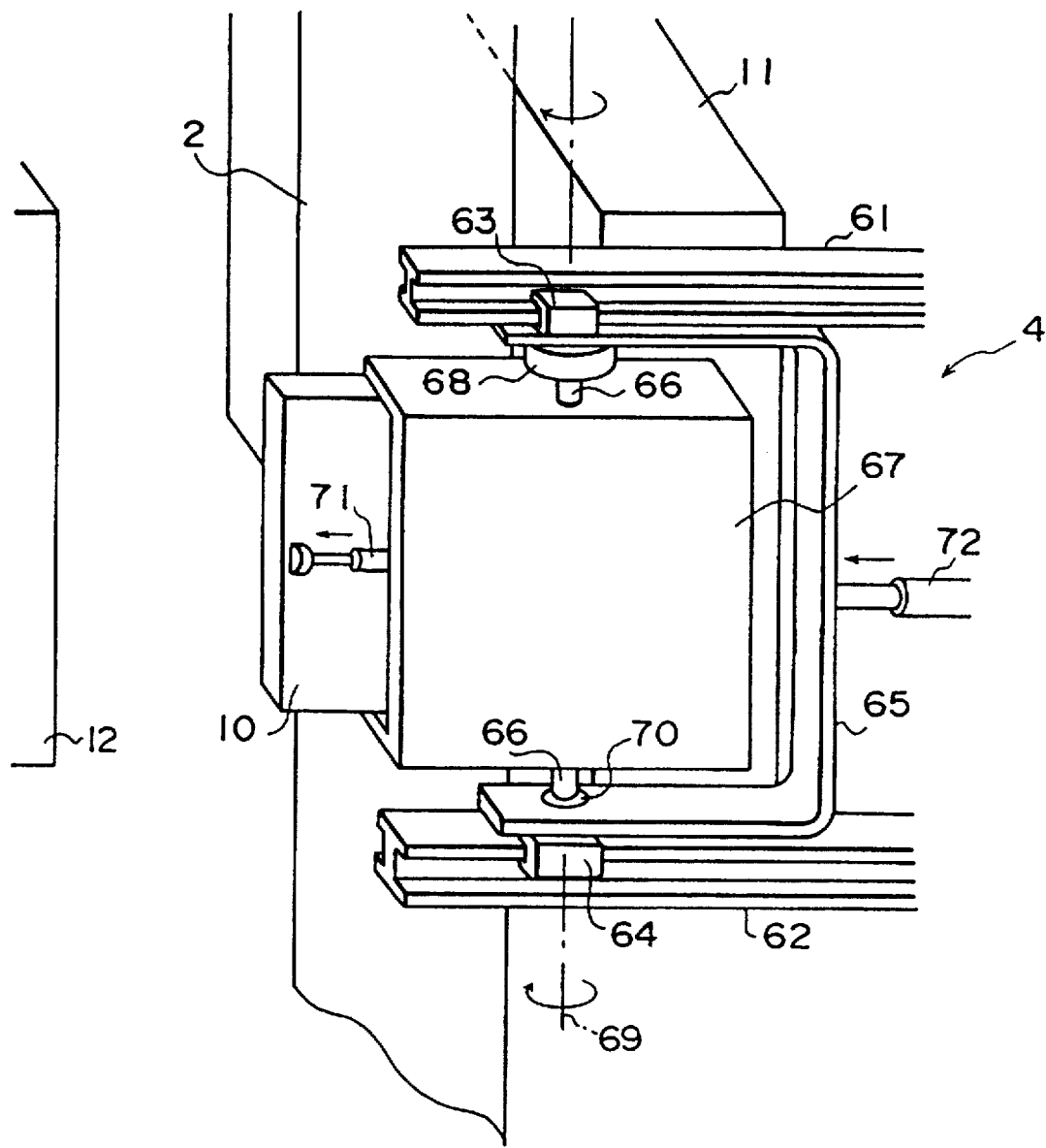
FIG. 12 is a perspective view showing the same heating body shown in FIG. 11, in which the heating body is advanced in the horizontal direction.

The heating body 60 accommodated in the heat board accommodate box 67 is of flat type, which can be projected or retracted from and into the heat board accommodate box 67 by use of another hydraulic piston and cylinder mechanism 71, as shown in FIG. 12. In the same way as with the case of the other embodiments, contact type heat board using the conduction heat or non-contact type using thermal radiation or induction heating type can be used as the heating body 60.

The heating operation of the fourth embodiment according to the present invention will be explained on the basis of the mechanism as described above.

First, as shown in FIG. 11, the heating body 60 is kept accommodated in the heat board accommodate box 67 and further the U-shaped box drive frame 65 located (refuged) on the reverse side surface of the molding machine between when the preceding molding cycle ends (the preliminary forming of the decorative pattern sheet 2, the mold clamping, the resin injection, the mold cooling, the mold opening, the molded product removal) and when the current molding cycle starts (the decorative pattern sheet 2 is supplied to a predetermined position of the mold A (11)). Here, the heat board accommodate box 67 is disposed in parallel to the guide rails 61 and 62 (i.e., the mold engagement direction).

After that, when the decorative pattern sheet is required to be heated, as shown in FIG. 12, the hydraulic cylinder 72 is actuated to move the U-shaped box drive frame 65 to the left side by the sliding motion of the sliders 63 along the guide rails 61 and 62. In addition, the heating body 60 is also moved toward the left side by the piston and cylinder mechanism 71 so as to be moved out of the heat board accommodate box 67.

Figure 13:
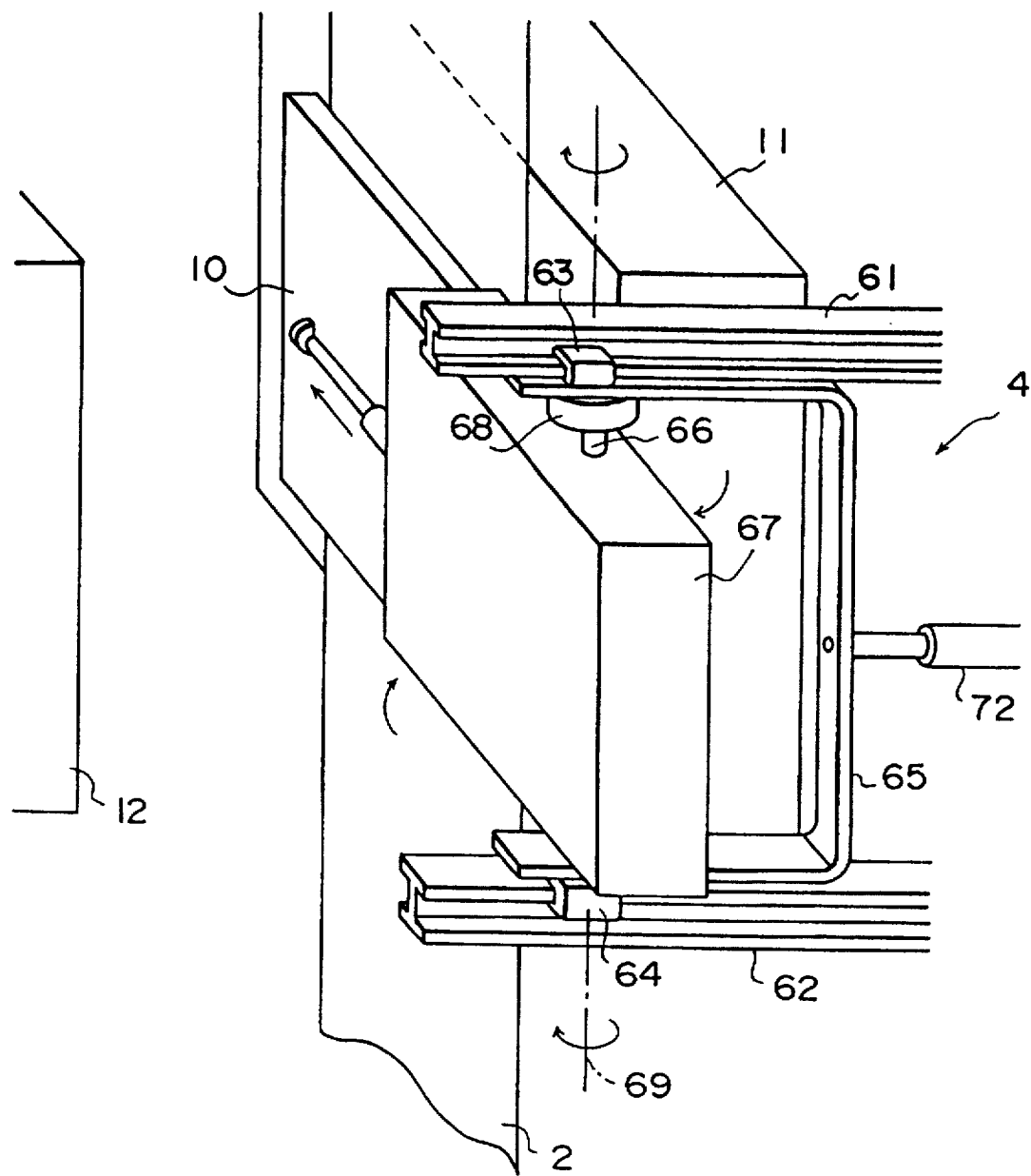
FIG. 13 is a perspective view showing the same heating body shown in FIG. 10, in which the heating body is confronted with the decorative pattern sheet.

Further, as shown in FIGS. 12 and 13, the motor 68 is driven to pivot the two axles 66 clockwise, so that the heat board accommodate box 67 is also pivoted clockwise via the bearings 70 interposed between the axles 66 and the box drive frame 65 (here the axles 66 are fixed to the heat board accommodate box 67). When the heat board accommodate box 67 and the heating body 60 are pivoted by 90 degrees and therefore located in parallel to the parting surface of the female mold A, the motor 68 is stopped.

At the same time or after the motor 68 is stopped, as shown in FIG. 12, the hydraulic cylinder 71 housed in the heat board accommodate box 67 is actuated to project the heating body 60, so that the heating body 60 can be confronted with the decorative pattern sheet 2 to be heated.

After the decorative pattern sheet 60 has been sufficiently heated and therefore softened, the heating body 60 and the peripheral devices are returned to the non-heating position in accordance with the operation opposite to the above-mentioned operation.

In more detail, the hydraulic cylinder 71 housed in the heat board accommodate box 67 is retracted to accommodate the heating body 60 into the heat board accommodate box 67. At the same time or after that, the motor 68 is driven in the reverse direction to pivot the heat board accommodate box 67 counterclockwise by 90 degrees to move the heating body 60 and the heating board accommodate box 67 away from the space between the two molds A and B as shown in FIG. 12. Further, the right side hydraulic cylinder 72 of the box drive frame 65 is retracted to move the heating board accommodate box 67 to the non-heating position along the guide rails as shown in FIG. 11.

Further, in the simultaneous injection molding and patterning method according to the present invention, the decorative pattern sheet is not particularly limited, and therefore any conventional decorative pattern sheet can be used. The decorative pattern sheet can be roughly classified into lamination type and transcription type. In the lamination type, the decorative pattern sheet is laminated on the molded product. In the transcription type, the decorative pattern sheet is composed of at least a sheet substrate of mold releasing type, and a transcription layer having a pattern or some function, so that only the transcription layer can be laminated on the molded product.

Further, in the present invention, "the decorative pattern sheet" implies the non-visible pattern or a functional layer of hard film, conductive film, etc., in addition to the visible pattern such as picture, characters, figures, etc., which are all formed onto the molded product as a decorative pattern or a functional layer.

Further, in the present invention, "the melted resin" implies the thermosetting resin (melted at room temperature) or two-liquid reactive hardening resin, in addition to the thermoplastic resin melted by heat which is ordinary used for the injection molding.

As described above, in the heating device according to the present invention, since the heating device and the simultaneous injection molding and patterning apparatus using the same can be compacted, it is possible to economize the installation space, so that it is possible to eliminate an additional installation work such that the ceiling height is increased or the hole is dug under the floor.

Further, since the positional relationship of the heating surface of the heating device between the non-heating position and the heat-position is non-parallel, it is possible to reduce the installation space of the simultaneous injection molding and patterning apparatus, as compared with the conventional apparatus in which the heating device is moved in a straight line between the non-heating position and the heating position, that is, the positional relationship of the heating device between the non-heating position and the heating position is parallel.

What is claimed is:

1. A simultaneous injection molding and patterning method, comprising:

providing first and second mutually opposing molds;

interposing a decorative pattern sheet between the molds;

moving a heating body from a non-heating position to a heating position so as to heat and soften a portion of the decorative pattern sheet positioned between the opposing molds, wherein the heating position is arranged such that a heating surface of the heating body confronts the decorative pattern sheet while the sheet is positioned between the opposing molds, and the non-heating position is arranged such that the heating surface of the heating body is not parallel to the heating surface of the heating body when in the heating position;

evacuating the first mold to bring the heated and softened decorative pattern sheet into contact with a cavity surface of the first mold;

closing the molds to define a mold cavity between the sheet in contact with the cavity surface of the first mold and a cavity surface of the second mold; and injecting molten resin into the mold cavity to form a molded patterned product including the decorative pattern sheet.

2. The method of claim 1, wherein the step of moving the heating body comprises moving the heating body obliquely upward away from the decorative pattern sheet interposed between the opposed molds.

3. The method of claim 1, wherein the non-heating position is located at about the same height as, but horizontally offset away from, the decorative pattern sheet interposed between the opposed molds.

4. The method of claim 2, wherein said heating body comprises at least on e rigid heating element.

5. The method of claim 4, wherein said heating body comprises a plurality of rigid partial heating elements linked with each other as a series of bendable elements.

6. The method of claim 4, wherein said heating body comprises a single rigid heating body.

7. The method of claim 2, wherein said heating body comprises a flexible flat heating generating body.

8. The method of claim 7, further comprising the step of attaching a weight to a lower end of the flexible flat heating generating body.

9. The method of claim 2, further comprising the steps of:

connecting a lower end of a flexible carrier to an upper end of the heating body;

winding the flexible carrier beginning from an upper end thereof; and guiding the lower end of the flexible carrier from a position corresponding to the non-heating position of the heating body to another position corresponding to the heating position of the heating body.

10. The method of claim 9, further comprising arranging a plurality of guide rollers in an upward convex shape and sliding the flexible carrier over the guide rollers between the heating and non-heating positions of the heating body.

11. The method of claim 9, comprising the steps of:

providing a guide rail formed in an upward convex shape; and using a moveable guide roller in the guide rail to support a lower surface of the heating body when the lower end of the flexible carrier is being guided along the guide rail.

12. The method of claim 3, further comprising the steps of:

positioning guide rails on each outer side surface of each of the first and second molds, such that the guide rails are arranged in a direction perpendicular to confronting surfaces of the opposing molds;

guiding the heating body in a direction parallel to a mated/demated direction of the molds;

pivoting the heating body to a direction parallel to the confronting surfaces of the molds; and translating the heating body to a position opposing one of the molds in a direction perpendicular to the guide rails at a predetermined position of the guide rails such that the heating body can be confronted with the decorative pattern sheet interposed between the opposing molds.

* * * * *